(12) United States Patent  (10) Patent No.: US 8,156,441 B1
Bihari et al.  (45) Date of Patent: Apr. 10, 2012

(54) INTER-GADGET COMMUNICATION

(75) Inventors: Shlomo Bihari, San Jose, CA (US);
Douglas A. Simmons, San Jose, CA (US); Lucian Y. Lam, San Jose, CA (US); Charles E. Lyons, Los Gatos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 692 days.

(21) Appl. No.: 12/290,816

(22) Filed: Nov. 4, 2008

(51) Int. Cl.
*G06F 3/00* (2006.01)

(52) U.S. Cl. ........ 715/748; 715/740; 715/749; 715/760; 715/804

(58) Field of Classification Search .................. 715/748, 715/740, 749, 760, 804
See application file for complete search history.

(56) References Cited

U.S. PATENT DOCUMENTS

| | | | |
|---|---|---|---|
| 2003/0025727 A1* | 2/2003 | Rath et al. | 345/744 |
| 2006/0064422 A1* | 3/2006 | Arthurs et al. | 707/10 |
| 2006/0190619 A1* | 8/2006 | Tenembaum et al. | 709/233 |
| 2008/0244681 A1* | 10/2008 | Gossweiler et al. | 725/133 |
| 2008/0298342 A1* | 12/2008 | Appleton et al. | 370/351 |
| 2009/0070409 A1* | 3/2009 | Clayton et al. | 709/203 |
| 2009/0265760 A1* | 10/2009 | Zhu et al. | 726/3 |
| 2009/0328063 A1* | 12/2009 | Corvera et al. | 719/315 |
| 2010/0057628 A1* | 3/2010 | Trinidad et al. | 705/301 |

* cited by examiner

*Primary Examiner* — Michael Roswell
(74) *Attorney, Agent, or Firm* — Oliff & Berridge, PLC

(57) ABSTRACT

Disclosed is an inter-gadget communication architecture or framework that allows information from different sources to be independently viewed or correlated from within a browser. The inter-gadget communication architecture or framework comprises gadgets or iFrames, which communicate or interact with other gadgets on the displayed page by accessing other iFrames/gadgets on the same web page. The inter-gadget communication architecture or framework allows gadgets to be vendor application agnostic, providing platform independence.

17 Claims, 9 Drawing Sheets

Fig. 4

```
Var IgcObjects = new Array();

IgcObjects = com.lmco.sj.fw.api.igc.getIgc(TYPE, igcId);

for (var x in igcObjects)

igcObjects[x].exposedMethod(parameter1, etc.)
```

Calling the getIgc( ) method and passing a TYPE (either "CATEGORY" or "GADGET" with corresponding igcId (predefined UUID), will return an array of one or more IGC objects of currently linked gadgets matching the TYPE and igcId paramaters. Then, for each returned IGC object, an exposed method can be called while passing the data to send to the other gadgets as parameters.

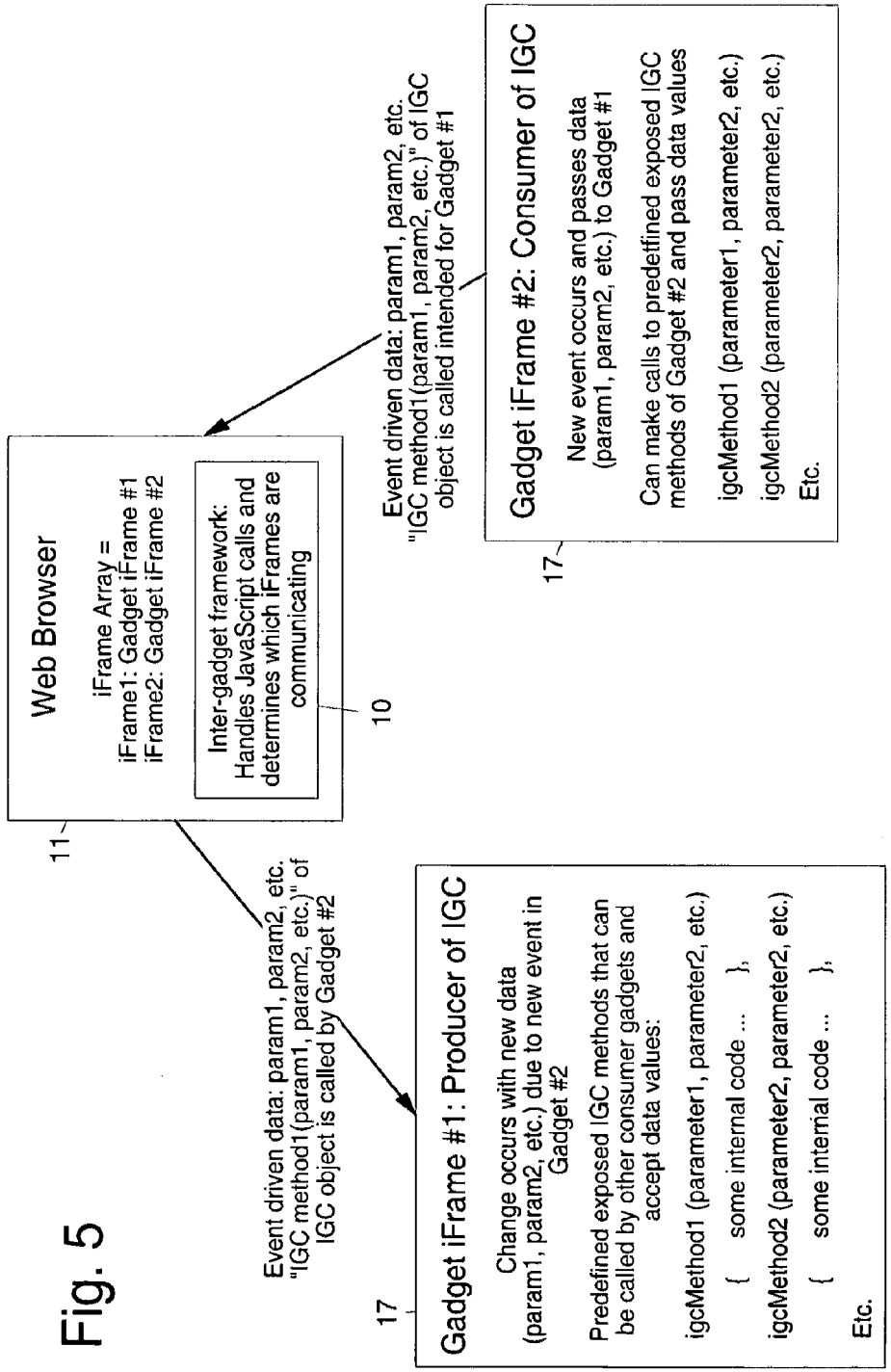

INTER-GADGET COMMUNICATION

BACKGROUND

The present invention relates to inter-gadget communication that allows electronic information from different sources to be independently viewed or correlated from within a browser.

The Department of Defense (DoD) and US government intelligence agencies process large amounts of electronic information. Traditionally, dissemination, handling, and correlation of electronic information is done manually. For instance, electronic information from a first source may be presented in one format, while electronic information from a second source may be presented in a different format. The only way to combine the electronic information from the two sources is to manually correlate the data from the two sources. Also, many conventional electronic solutions have vendor constraints, which prevent combining source information.

In particular, the industry has tried to address part of the information correlation problem using portals. Major vendors such as BEA and IBM, for example, have developed portlet-to-portlet communication to permit two different sources to communicate via portlets. However, each vendor's portlets only communicate within that vendor's portal. In addition, gadgets have been developed by such organizations as Google, Microsoft, and Apple Computer, for example. Gadgets are small objects that allow dynamic content to be placed on a web page.

A mashup is a web application hybrid that combines data from more than one source into a single integrated tool. Thus, a mashup combines data from different sources in one place using JavaScript. A mashup does not involve simple embedding of data from another site to form a compound document. An example, cartographic data from Google Maps™, for example, may be used to add location information to real-estate data, thereby creating a new and distinct web service that was not originally provided by either source.

Content used in mashups is typically sourced from a third party via a public interface, application programming interface (API) or web service. The architecture of mashup web applications always has three parts. The first part is the content provider, which is the source of the data. Data is made available using an application programming interface (API) and different Web-protocols such as RSS, REST, and Web Service, for example. The second part is the mashup site. The mashup site comprises the web application that provides the new service using different data sources that are not owned by it. The third part is the client web browser. The client web browser is the user interface of the mashup. In a web-application, the content can be mashed by the client web browser using a client-side web language, such as JavaScript.

It would be desirable to have an inter-gadget communication framework that provides for an improved way to mash up the data derived from multiple sources. It would be desirable to have inter-gadget communications that provides an open way to correlate and view information from differing sources independent of vendor deployed solutions.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4 illustrates exemplary consumer gadget calling methods of an IGC object;

FIG. 5 illustrates passing of data between gadget iFrames;

DETAILED DESCRIPTION

Figure 1:
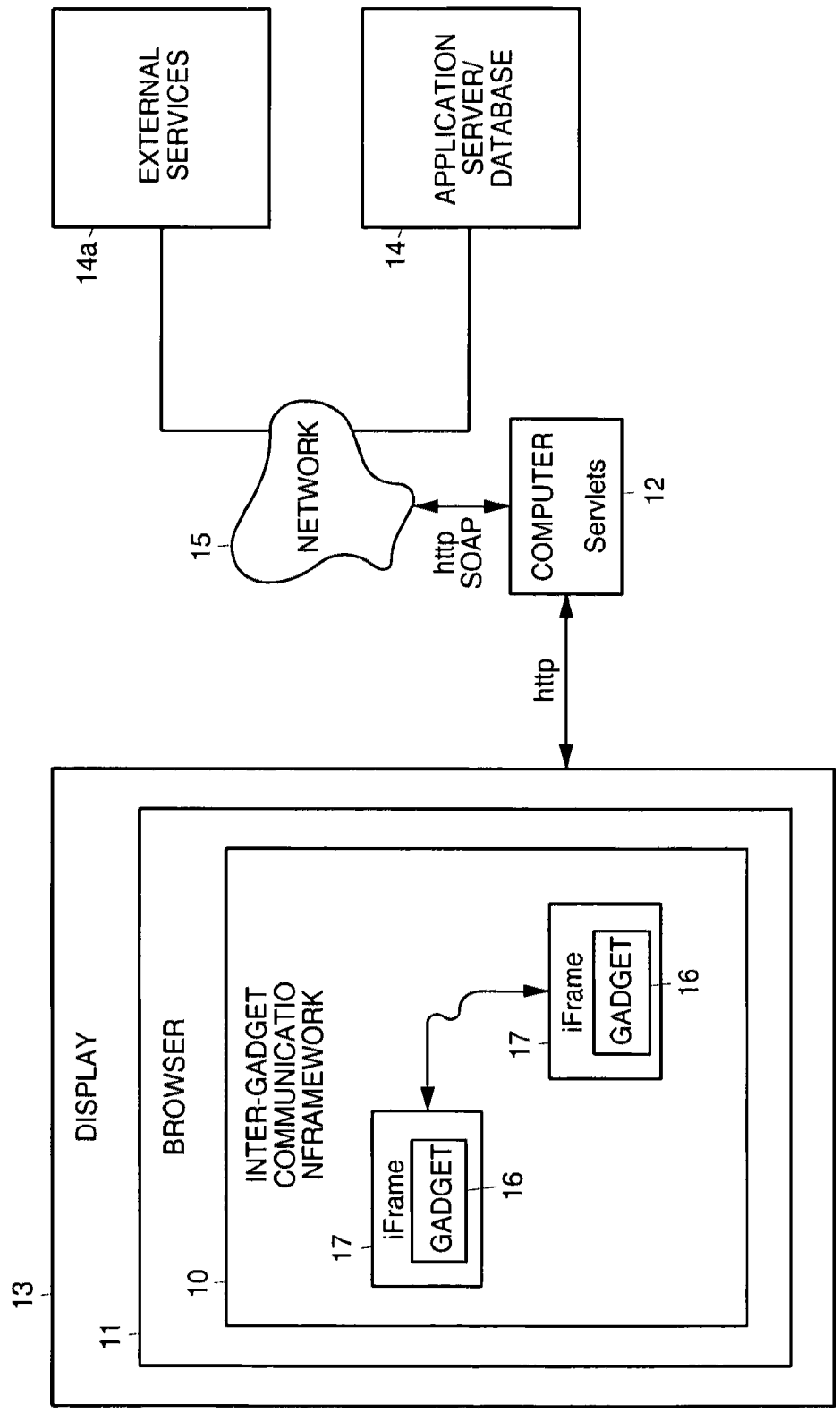
FIG. 1 illustrates a system implementing an exemplary inter-gadget communications architecture or framework.

Referring now to FIG. 1, it illustrates an exemplary inter-gadget communication (IGC) architecture 10 or framework 10. The inter-gadget communications architecture 10 or framework 10 permits correlation and viewing of information derived from different sources.

The exemplary inter-gadget communications architecture 10 or framework 10 comprises a browser 11 that runs on a computing device 12 having a display 13. The computing device 12 may be a personal computer, a laptop computer, a personal digital assistant (PDA), or a cellular device, for example. The computing device 12 is connected to various sources of information or data, such as one or more application servers 14, and other external services 14a, coupled to the computing device 12 via a network 15 or the internet 15. The computing device 12 communicates with the application servers 14, or external services 14a, using servlets. The computing device 12 communicates with the browser 11 using an http (hypertext transfer protocol), and over the network 15 using an http-SOAP protocol (hypertext transfer protocol, simple object access protocol).

The exemplary inter-gadget communication architecture 10 or framework 10 allows information from different sources 14 to be independently viewed or correlated within the browser 11. The inter-gadget communication architecture 10 or framework 10 comprises a plurality of gadgets 16 that are displayed within the browser 11 and allows data to be communicated between and shared by the gadgets 16. FIGS. 2-5 illustrate details relating to this.

Figure 2:
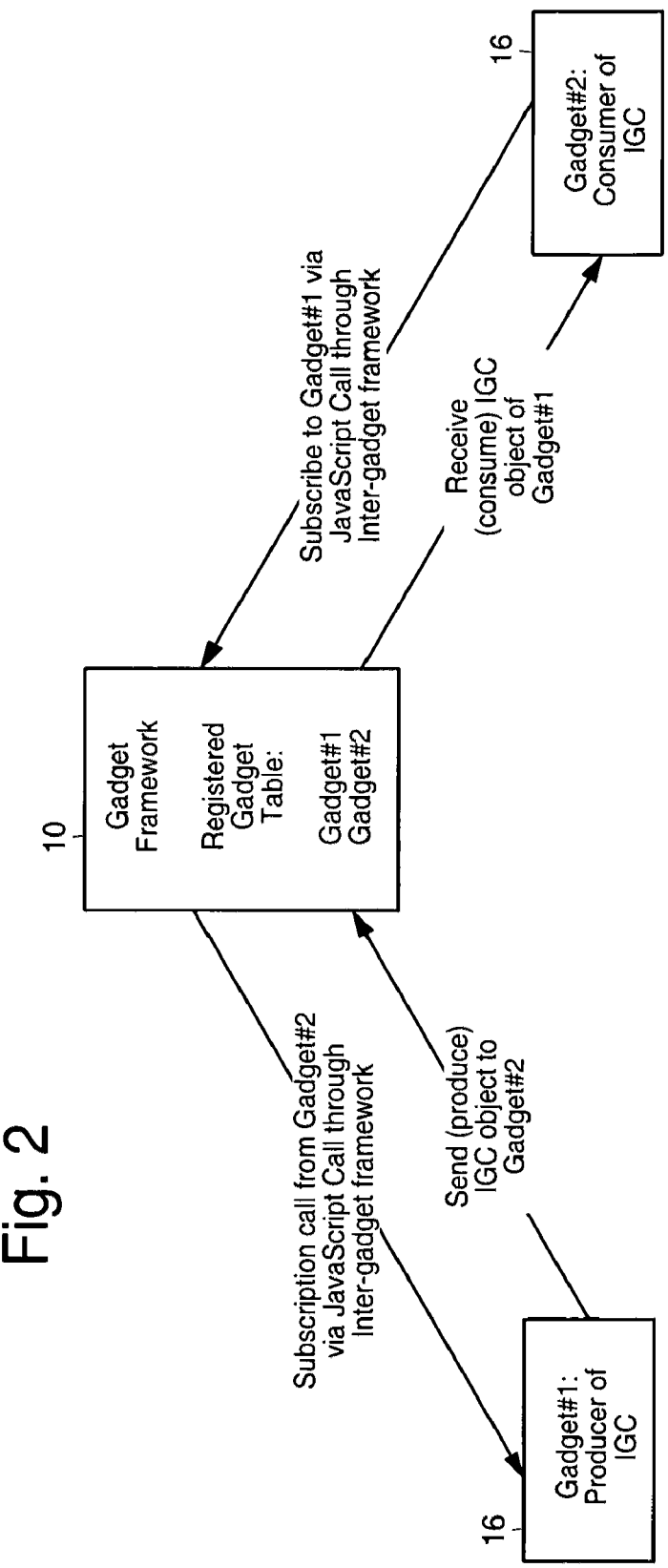
FIG. 2 illustrates the flow of IGC object gadgets.
Figure 3:
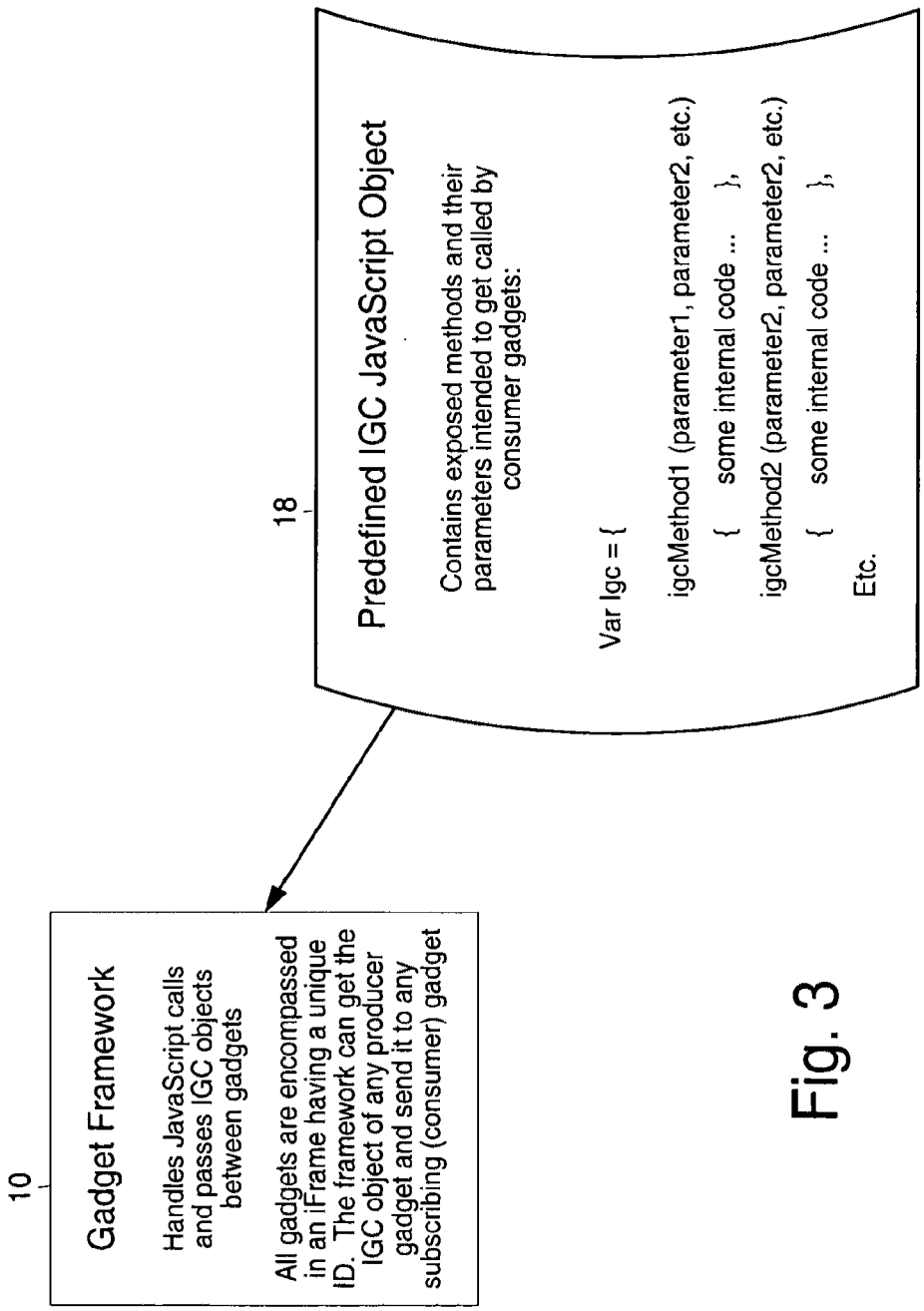
FIG. 3 illustrates an exemplary IGC object of a producing gadget.

FIG. 2 illustrates the flow of IGC objects between gadgets 16, FIG. 3 illustrates an exemplary IGC object 18 of a producing gadget 16, FIG. 4 illustrates exemplary consumer gadget snippet code calling methods of an IGC object, and FIG. 5 illustrates passing of data between gadget iFrames 17. All gadgets 16 exist inside different iFrames 17 on a web page displayed within the browser 11. When each gadget 16 is created inside the gadget framework 10, an iFrame 17 with unique session ID is created with contents provided via a Uniform Resource Locator (URL). By default to Hypertext Markup Language (HTML) and browser standards, the web page holds the current state of all frames (including iFrames 17) residing on it. These frames can be accessed from a frames object array, using the unique session ID of each iFrame 17 created by the inter-gadget framework 10.

Gadgets 16 and their iFrames 17 have their own object and variable space, separate from the main web page. Gadgets 16 can call JavaScript methods in the object space of other gadgets 16 via the frames object array of the web page as long as the contents of the gadgets 16 and the framework 10 reside in the same domain and as long as the gadget 16 is able to point to that specific frame object 18 of the other gadget 16 from the frames array. Methods such as the following can thus be accessed:

iframeObject.method (param1, param2, etc.).

When calling these methods, data are passed from one gadget 16 to another as parameters. The inter-gadget framework 10 and the IGC architecture 10 deal with communication of data between gadget iFrames 17 by controlling the session IDs of the frame objects 18 on the web page and by passing IGC objects 18 between gadgets 16. Not all gadgets 16 have an IGC object 18, but for those that do, their IGC object 18 contains all necessary exposed methods that other gadgets 16 can call upon and pass data to.

The inter-gadget communications architecture 10 or framework 10 provides the look, feel and experience of a personal computer desktop. The inter-gadget communications architecture 10 or framework 10 allows importing of and collaboration between gadgets 16, such as iGoogle gadgets, widgets, and other third party gadgets. New gadgets 16 may be created using a JavaScript application programming interface (API) of the architecture 10 or framework 10.

As mentioned above, each gadget 16 that participates in inter-gadget communication has an IGC object 18 (FIG. 3). Gadgets 16 can either be producers of inter-gadget communication, consumers of inter-gadget communication, or both. As a consumer of inter-gadget communication, when a gadget 16 is developed it must include the provided JavaScript API available from the framework 10 and therefore be able to consume any available predefined IGC objects 18 from other gadgets 16 by using a specific gadgetLibraryId or igcCategoryId of the gadget 16 or gadgets 16 it wishes to connect with. Any gadget 16 written in any form or language, including RIA (Rich Internet Application), must be able to interface with JavaScript for inter-gadget communication to work. Therefore, developers or authors of pre-existing gadgets (iGoogle, Netvibes, etc.) can add the necessary code to include the IGC API and use it. If an author or developer wishes to make a pre-existing gadget 16 a producer of inter-gadget communication, where other gadgets 16 can consume its IGC object 18 and pass data along to it, they would create a JavaScript IGC object 18 with exposed methods and a set of parameters such as is shown in FIG. 3, for example. These exposed JavaScript methods can then internally call the necessary internal or private methods of that gadget 16. The inter-gadget communications architecture 10 or framework 10 provides a repository for discovery and distribution of gadgets 16.

Gadgets 16, such as mini-applications, portlets, or widgets, and the like, are browser-based interfaces for services and information. Every gadget will be uniquely identified in the repository with a pre-generated gadgetLibraryId that gets assigned whenever a new gadget is submitted. Exemplary gadgets 16 may comprise RSS feeds, Distributed Common Ground System Integration Backbone (DCGS-DIB) services, Extensible Markup Language (XML) services, Keyhole Markup Language (KML) services, Google Earth™ services, Virtual Earth™ services, or access to mission data, and the like. The gadgets 16 are developed using standards similar to those used by Google, Microsoft and others. The gadgets 16 provide interoperability with services provided by Websphere, Weblogic, SharePoint and JBoss, for example.

Many types of gadgets 16 developed today can operate in different web pages or portals, as long as they are developed using web standards. The mini-application front-end of the gadget 16 can be used in any web form. However, in order to use the added capability of inter-gadget communication, the gadgets 16 need to be placed in a framework 10 that supports and works with the IGC API. Existing portal investment and development is thus preserved using the inter-gadget communications architecture 10 or framework 10.

Figure 6:
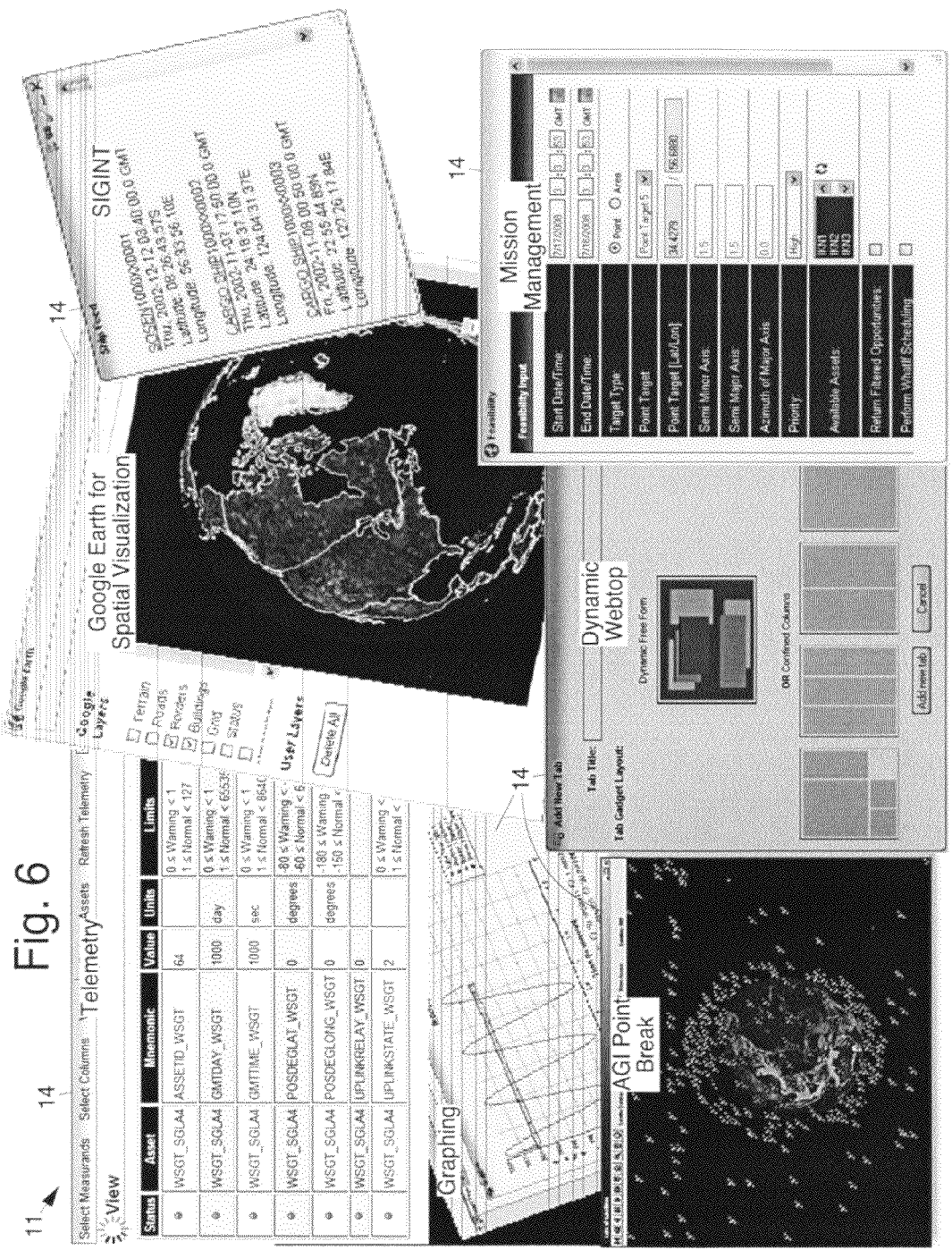
FIG. 6 illustrates exemplary gadgets that may be used in the exemplary inter-gadget communications architecture or framework.
Figure 7:
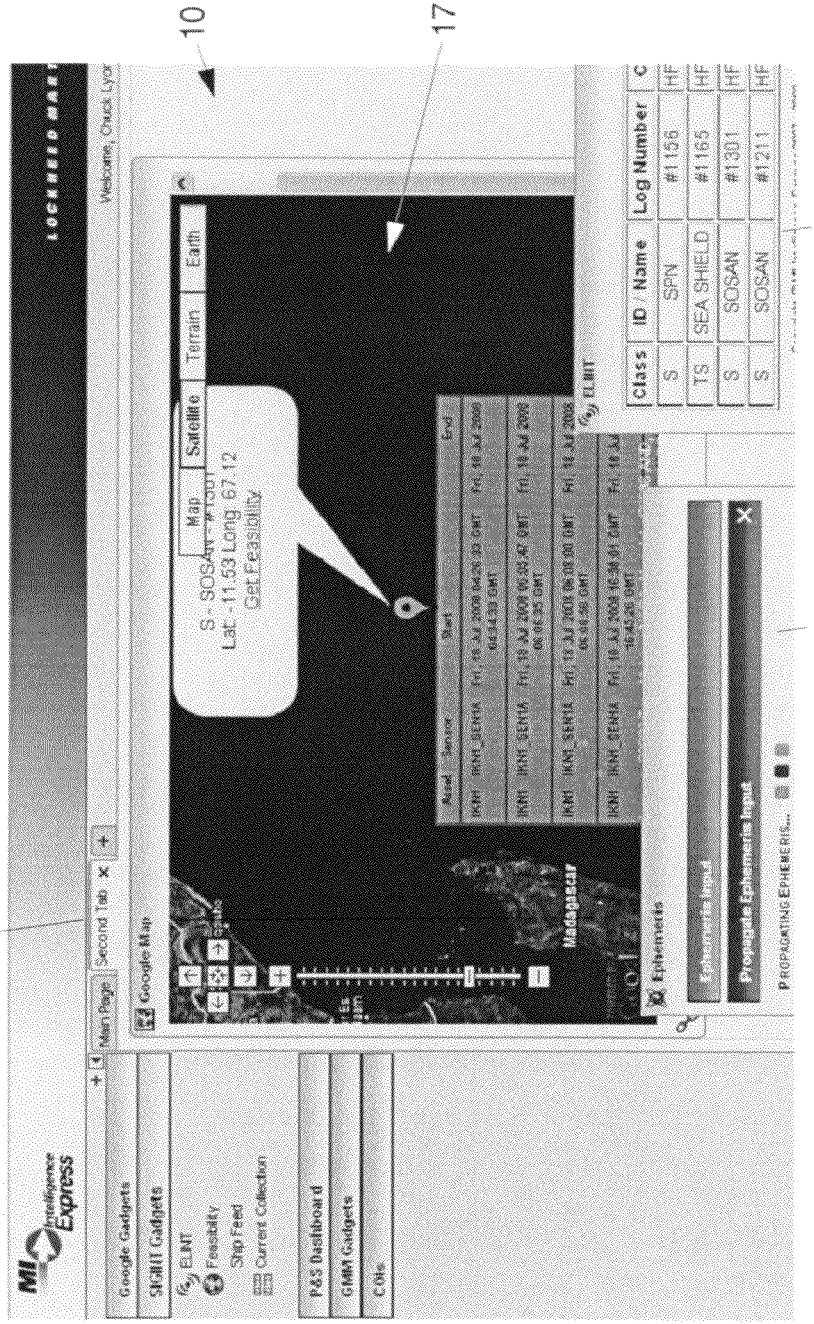
FIG. 7 illustrates several gadgets integrated on a web page using the exemplary inter-gadget communications architecture or framework.
Figure 8:
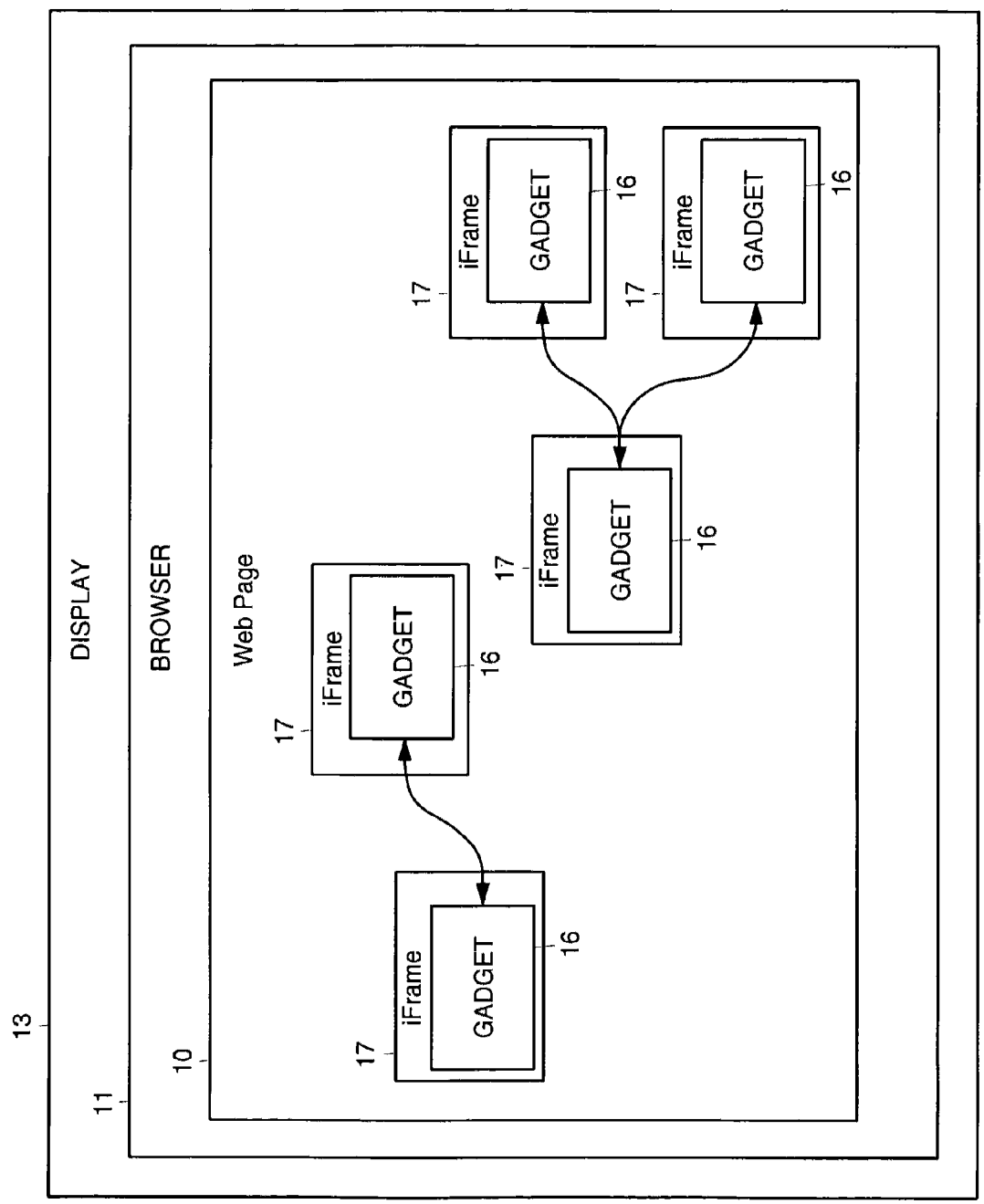
FIG. 8 is a block diagram that illustrates inter-gadget communication within a web page displayed in a browser.

FIG. 6 illustrates exemplary gadgets 16 that may be used in and processed by the exemplary inter-gadget communications architecture 10 or framework 10. FIG. 7 illustrates multiple gadgets 16 integrated on a single web page using the exemplary inter-gadget communications architecture 10 or framework 10. FIG. 8 illustrates inter-gadget communication within a web page displayed in the browser 11.

The inter-gadget communications architecture 10 or framework 10 provides for a web page or application that integrates complementary elements from two or more sources 14, 14a. Gadgets 16 can display data or connect with sources 14 or services 14a in any way or form as they wish. Once the data is available on the gadget 16, using inter-gadget communication, it can pass along that data to other gadgets 16 on the web page that may or may not be connected to other sources 14 or services 14a on their own. Therefore, data from multiple sources 14, 14a can thus be put together on the client side using inter-gadget communication. The web page or application may be created using Ajax (Asynchronous Javascript and XML) web development techniques, for example. The inter-gadget communications architecture 10 or framework 10 allows two or more gadgets 16 to interact with each other by sharing complementary data.

The inter-gadget communications architecture 10 or framework 10 is a complement to the currently-available Ajax framework. Client-side communication is accomplished using inter-gadget communication. The gadget framework 10 handles the transaction of IGC objects 18 between gadget iFrames 17. While each gadget 16 may obtain data from a server 14 or service 14a, the IGC data layer occurs all on the client side.

Data communicated between gadgets 16 may include latitude and longitude data, ship identification numbers, or similar data. For example, the inter-gadget communications architecture 10 or framework 10 may embody geospatial gadgets 16. Such geospatial gadgets 16 have map plotting capabilities, allowing point plotting, line plotting and plot shaping. Thus, existing plotting capabilities may be displayed using the application programming interface (API).

Other gadgets 16 may include RSS feeds, signal data and XML data, and the like. Using the inter-gadget communications architecture 10 or framework 10, all such gadgets can call exposed plotting methods to any geospatial gadget. Any RSS, signal, or XML data that has geospatial coordinates can then be passed on to any geospatial gadget 16 and plotted accordingly within the inter-gadget communications architecture 10 or framework 10.

Thus, the browser 11 is configured to process and display gadgets 16. The gadgets 16 employed in the inter-gadget communications architecture 10 or framework 10 are different from conventional gadgets. Each gadget 16 is a standalone element that is displayed in the browser 11. The gadgets 16 are vendor application agnostic in the inter-gadget communication architecture 10 or framework 10, thus providing platform independence. Gadgets 16 are comprised of Hypertext Markup Language (HTML) or JavaScript code employing Asynchronous JavaScript and XML (AJAX) requests to get data, or Java Server Pages (JSP) content to acquire data from a server 14, which data are presented in the browser 11.

As long as the gadgets 16 are written using web standards, they should be similar to conventional web 2.0 gadgets already in existence. A major difference is that each gadget's contents 16 can be run in a separate web page, and thus can be minimized to take form inside an iFrame 17 of smaller size in the framework 10. Also, the included JavaScript IGC API and code adds additional functionality that conventional gadgets do not have.

Figure 9:
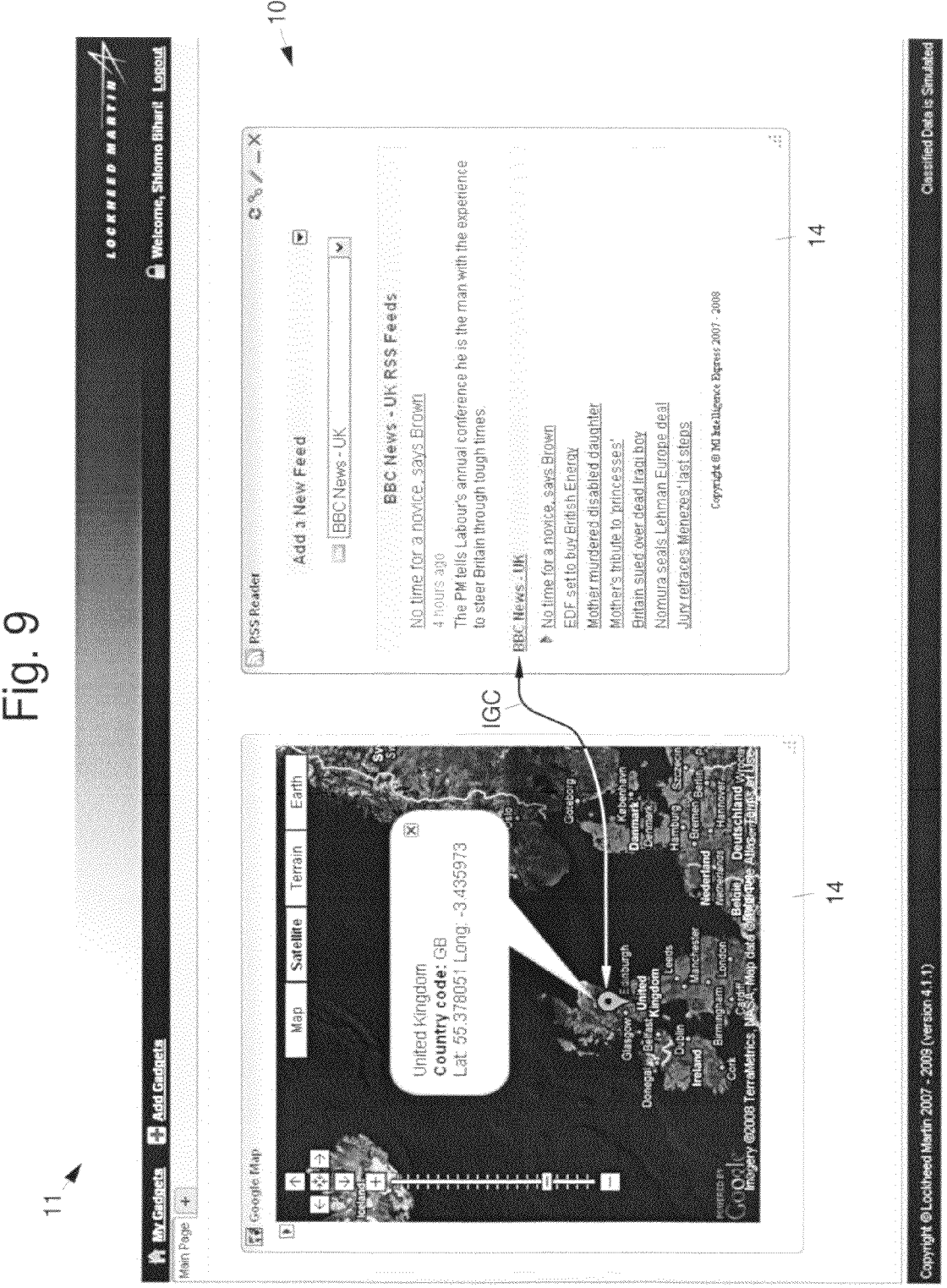
FIG. 9 pictorially illustrates exemplary inter-gadget communications between GeoRSS and Google Maps.

Referring to FIG. 9, in the inter-gadget architecture 10 or framework 10 several gadgets 16 are brought together on a single HTML page using iFrames 17. FIG. 9 shows two inter-communicating gadgets 16 at the upper left portion of the browser window that communicate with each other using inter-gadget communications, and three intercommunicating gadgets 16 at the lower right portion of the browser window wherein two gadgets 16 intercommunicate with a third gadget 16. HTML provides the ability to split a content window of the browser 11 into several frames. Each of the iFrames 17 comprises a window of its own within the content window (i.e., the main window of the browser 11). The iFrame 17 is an inline frame that contains a completely separate web page with its own URL (i.e., the gadget 16).

The gadget framework 10 is configured so that it is aware of all unique session IDs assigned to each gadget iFrame 17, since the framework 10 creates the iFrames 17 when the gadgets 16 load and assigns a unique ID. When a gadget 16 is requesting to call exposed methods of another gadget 16, the framework 10 can get the iFrame object 18 of the corresponding gadget 16 from the frames array. Once the iFrame object 18 is obtained, the exposed methods can be called from within. Gadgets 16 that have exposed methods for other gadgets 16 to use will wrap and include these methods and their parameters inside an IGC (JavaScript) object 18. When two or more gadgets 16 link together through the framework 10, the framework 10 grabs the corresponding IGC objects 18 from the producer gadgets 16 and sends them out to the consumer gadgets 16.

All gadgets 16 that use inter-gadget communications preferably include the following JavaScript files available from the gadget framework 10: "/fw/lib/Prototype/1.6.0.2/prototype.js" and "/fw/api/js/fwapi.js". The inter-gadget communications JavaScript files include basic hash map functionality as well as the following objects to be used for IGC by the gadgets or internally by the framework 10:

igcObjectHash, which is a hash map with a name-value pair linking gadget session IDs of currently linked gadgets with their IGC objects;

igcGadgetSpecificHash, which is a hash map with a name-value pair linking gadget Library IDs with an array of gadget session IDs of currently linked gadgets;

igcCategoryHash, which is a hash map with a name-value pair linking IGC category IDs with an array of gadget session IDs of currently linked gadgets;

register: function ( ), which registers the gadget inside Framework;

linkGadget: function (gadgetSessionId), which links the gadget to a gadget with an ID of gadgetSessionId and stores its igcObject inside the igcObject hash map;

unregister: function ( ), which unregisters the gadget from the Framework;

unlinkGadget: function (gadgetSessionId), which unlinks the gadget from gadget with an ID of gadgetSessionId and removes the appropriate igcObjects from the hash map; and getIgc: function (TYPE, igcId), which returns an array of igcObjects of all currently linked gadgets with either gadgetLibraryId==igcId (if TYPE=="GADGET") or with IGC producer category Id==igcId (if TYPE=="CATEGORY").

The functions and objects listed above are part of the exposed API that the framework 10 provides to all gadgets 16. Once the gadget 16 includes the reference to the API, it can call any of these methods. Only two of these methods (register and getIgc) are to be used by gadget developers, while the rest of the methods are used internally by the framework. When the gadget 16 contents are loaded in the web page, the gadget 16 calls the register( ) function to register in the framework 10. Once registered, a user may automatically or manually link the gadget 16 to another gadget 16. If acceptable, the framework linking process internally calls the linkGadget( ) function to link the two gadgets 16 and the IGC objects 18. When two gadgets 16 link, the framework 10 gets all corresponding IGC objects 18 from all the linked producer gadgets 16 and sends them to all the linked corresponding consumer gadgets 16. The unregister( ) and unlinkGadget( ) functions, called internally by the framework, do the opposite and remove the IGC functionality. IgcObjectHash, igcGadgetSpecificHash, and igcCategoryHash are three variables referencing hash maps that correspond to retrieving all IGC objects 18 of all the gadgets 16 that a gadget 16 is currently linked to. The function getIgc( ) is used to retrieve the necessary IGC object 18 and call any of the included exposed methods to pass along data.

Pertinent attributes of inter-gadget communications are that (1) a gadget 16 is known as a producer of inter-gadget communications and a consumer of inter-gadget communications; (2) as a producer, a gadget 16 contains an IGC object 18 that the framework 10 can access and send to other gadgets 16 that register and link as consumers; (3) gadgets 16 can consume IGC objects 18 of a specific gadget 16 (via a gadget Universally Unique Identifier or UUID) or of a specific IGC category (via IGC category UUID); (4) all IGC objects 18 of a specific category UUID have the same exposed methods (including the same parameters).

Once a gadget 16 is developed, it can be submitted to a gadget library or repository which will retain all necessary metadata for that gadget 16. This metadata can include gadget size, author details, category, etc. The majority of the metadata is based on the Netvibes Widgets 1.0 proposal and Google GModule Gadget specifications that have already been established. In addition to this metadata, the IGC attributes required for the framework 10 to use are also included. These IGC attributes determine whether a gadget 16 is a producer, consumer, or both. Also, they determine which gadgets 16 it will be able to link to via IGC. Once the gadget 16 is submitted, a UUID for the gadget, known as the Gadget Library ID, is then generated automatically by the server. This UUID defines this specific gadget 16 in the gadget repository or library, and any other gadget 16 that wishes to link to it will use this UUID as its IGC attributes. This UUID is different than the Gadget Session ID, which is a UUID that gets generated dynamically by the framework when a gadget is created on the web page once the user selects a gadget from the repository or library. If the gadget 16 belongs to an IGC category, where the exposed methods are pre-defined, then other gadgets 16 are able to link to it using the pre-existing IGC category UUID. This UUID is also generated automatically, but only each time a new IGC category gets created. The inter-gadget communications attributes for a gadget 16 are as follows:

Producer:
  Gadget Library ID: (Library UUID of the gadget would be populated here if gadget produces an IGC object not belonging to an IGC category)
  IGC Category ID: (UUIDs of IGC categories populated here if gadget produces IGC objects belonging to IGC categories of gadgets)
Consumer:
   Gadget Library ID: (Library UUIDs populated here if gadget consumes IGC objects of those gadgets with Library IDs)
   IGC Category ID=(UUIDs of IGC categories populated here if gadget consumes IGC objects belonging to IGC categories of gadgets)

The rest of the gadget attributes, based upon the Netvibes Widgets 1.0 W3C and Google GModule Gadget specifications include: LibraryId (UUID generated by back-end to identify specific gadget in entire listing or library); SessionId (UUID generated by back-end to identify specific gadget generated on web page); Width; Height; Url; Description; Icon (link); Thumbnail (link); Image (link); Author (Optional) including Name, Organization, Email and Link.

Whenever a gadget 16 is developed, an IGC object 18 is written for the framework 10 to send out to other gadgets 16. The new IGC object 18 includes all necessary methods that are exposed for other gadgets 16 to call upon and pass data through. An exemplary IGC object 18 has the form:

```
var Igc={
exposedMethod1 (parameter1, parameter2, etc.)
exposedMethod2 (parameter1, parameter2, etc.)
Etc.
}
```

An IGC category of gadgets 16 has similar generic methods exposed. For example, all map plotting gadgets have Igc.plotPoint(latitude, longitude) and Igc.plotLine(latitudeArray[ ], longitudeArray[ ]) as their exposed methods. All gadgets 16 that adhere to a single category of inter-gadget communications, as opposed to being gadget specific, have the same exposed methods and parameters.

An exemplary IGC object 18 for a Google map gadget 16 is as follows:

```
var Igc={
plotPoint: function (name, infoContent, latitude, longitude, iconUrl)
{
   /*internal code */
}
plotLine: function (name, infoContent, latitudes, longitudes, color)
{
   /*internal code */
}
plotPolygon: function (name, infoContent, latitudes, longitudes, color)
{
   /*internal code */
}
}
```

Exemplary calling methods of an IGC object 18 are as follows.

Whenever a gadget 16 is developed, code is written to call exposed methods of other gadgets 16 using the provided JavaScript API of the gadget framework 10. This code may be formatted in the same fashion as is shown in FIG. 4.

When the contents of a gadget 16 load onto the HTML page, an API call is made to register the gadget 16 within the framework 10, i.e.:
   com.lmco.sj.fw.api.igc.register( ).

Once, the linking event process is triggered, an IGC object 18 is sent by the framework 10 that includes all necessary exposed methods.

The IGC object 18 is then added into the gadget's igcObject hash map and can be accessed using either the IGC Category ID or the Gadget Library ID for later retrieval:
   com.lmco.sj.fw.api.igc.getIgc(TYPE, igcId).

An exemplary IGC object retrieval process will now be described. An exemplary process for retrieving an IGC object 18 and calling its exposed method is as follows. This flow of IGC object retrieval is actually done by the gadget framework internally, while the developer of the consumer gadget would only have to reference the getIgc( )method mentioned above. Reference is made to the three hash maps below. First, the gadget framework must get the session IDs of all currently linked gadgets for either a specific IGC category or single IGC gadget 16:

This makes a call to one of two intermediate Hash Maps that return an array of gadgetSessionIds of all currently linked gadgets with either:
   A) gadgetLibraryId=igcId (if type="GADGET")
   B) igc producer category==igcId (if type="CATEGORY")
Gadget Library Hash:

| Gadget Library ID | Gadget Session IDs |
|---|---|
| gadgetLibId_0 | [gadgetSessionId_0, gadgetSessionId_1, gadgetSessionId, . . . ] |
| gadgetLibId_1 | [gadgetSessionId_0, gadgetSessionId_1, gadgetSessionId, . . . ] |
| . . . | . . . |

IGC Category Hash:

| Gadget Library ID | Gadget Session IDs |
|---|---|
| igcCategoryId_0 | [gadgetSessionId_0, gadgetSessionId_1, gadgetSessionId_2, . . . ] |
| igcCategoryId_1 | [gadgetSessionId_0, gadgetSessionId_1, gadgetSessionId_2, . . . ] |
| . . . | . . . |

Once the gadgetSessionIds are known, the igcObject can get retrieved from the igcObject hash map. This makes a call to a final Hash Map that returns IGC object for a specific gadget with now known sessionId.

IGC Object Hash:

| Gadget Session ID | IGC Object |
|---|---|
| gadgetSessionId_0 | Igc = { <br> method1: function ( . . . ) { . . . } <br> method2: function ( . . . ) { . . . } <br> . . . } |
| gadgetSessionId_1 | Igc = { <br> method1: function ( . . . ) { . . . } <br> method2: function ( . . . ) { . . . } <br> . . . } |
| . . . | . . . |

An exemplary IGC object 18 used by a GeoRSS gadget 16 is as follows:
   IGC Category ID for map plotting category of gadgets: "map-plot-category1", linked Google Map gadget with LibraryId="google-map-lib1" and SessionId="google-map-session004". GeoRSS gadget must get IGC object of currently linked Google Map gadget:

com.lmco.sj.fw.api.igc.getIgc ("CATEGORY", "map-plot-category1")
        returns [IGC object of Google Map gadget with sessionId="google-map-session004"].

While in actuality a total of three hash maps are used to retrieve the IGC object 18, from a higher level it is like one hash map. This "single" hash map is for the IGC objects 18 of the GeoRSS gadget 16 and conceptually looks like this:

| IgcId (TYPE = CATEGORY) | IGC Object |
| --- | --- |
| map-plot-category1 | Igc = {<br>plotPoint: function ( ... ) { ... }<br>plotLine: function ( ... ) { ... }<br>plotPolygon: function ( ... ) { ... }<br>} |

From within the returned igcObject, the Geo RSS gadget can call the exposed Google Map gadget methods, and pass the proper parameters, for example:
    Igc.plotPoint(name, htmlContent, latitude, longitude).

Exemplary inter-gadget communications between GeoRSS and Google Maps is pictorially illustrated in FIG. 9. A GeoRSS gadget 16 in an iFrame 17 having gadgetLibraryId="geo-rss-lib1" and sessionId="geo-rss-session012" communicates with a Google Map gadget 16 in an iFrame 17 having gadgetLibraryId="google-map-lib1" and sessionId="google-map-session004" using the inter-gadget communications object Igc.plotPoint(name, htmlContent, latitude, longitude).

The IGC attributes of the Google Map gadget 16 in the iFrame 17 are:
    Producer:
        Gadget Library ID="google-map-lib1" (UUID for Google Map Gadget)
        IGC Category ID="map-plot-category1" (UUID for map plotting category of gadgets 16)
    Consumer:
        Gadget Library ID=[None]
        IGC Category ID=[None]

The IGC attributes of the GeoRSS gadget 16 in the iFrame 17 are:
    Producer:
        Gadget Library ID=[None]
        IGC Category ID=[None]
    Consumer:
        Gadget Library ID=[None]
        IGC Category ID="map-plot-category1" (UUID for map plotting category of gadgets 16)

The IgcObject hash map is:

| Gadget Session ID | IGC Object |
| --- | --- |
| google-map-session004 | Igc = {<br>plotPoint: function ( ... ) { ... }<br>plotLine: function ( ... ) { ... }<br>plotPolygon: function ( ... ) { ... }<br>} |

The size of the iFrame 17 may be specified in the surrounding HTML page, so that the surrounding web page can be presented in the browser 11 while the iFrame 17 is being loaded. Thus, when an iFrame 17 is generated by the web page, several attributes can be specified: URL to the contents, size of the iFrame 17, and unique session ID or name for the iFrame 17. An iFrame 17 can thus be of specific size and take up only part of the web page. The iFrame 17 will also have a library ID and point to a unique URL, all provided by the metadata in the back-end. The iFrame 17 behaves much like an inline image and the user can scroll it out of view. The iFrame 17 can also contain its own scroll bar, independent of the scroll bar of the surrounding web page.

Each gadget 16 may be an iFrame 17, which can communicate or interact with other gadgets 16 on the same web page by accessing other iFrames 17/gadgets 16 on the same web page. When a new gadget 16 is added to a web page, a new iFrame 17 is generated through a W3C Document Object Model (DOM). Thus, when a gadget 16 is dragged into the web page, the gadget framework 10 generates the gadget 16, including the corresponding iFrame 17, according to the attributes given from the gadget repository or library. Each gadget 16 has a predefined library UUID that maps to a specific gadget listing in the gadget repository or library. The framework 10 simply creates a DIV HTML element for each gadget 16, which includes all necessary attributes and appropriate iFrame 17 with newly generated session UUID. Each iFrame 17 or gadget 16 holds separate HTML content with JavaScript.

The inter-gadget communication architecture 10 or framework 10 thus embodies gadgets 16 that export specific methods that can be used by other gadgets 16. By allowing other gadgets 16 to call these exported methods directly on the HTML DOM layer, data can be passed between different gadgets 16. Gadgets 16 can therefore asynchronously pull data from different sources and web services, and through the inter-gadget communication architecture 10 or framework 10, the data can mash-up on the client-side of the browser 11. Gadget developers can then export new methods (produce IGC) for other gadgets 16 to call upon or use available method calls (consumer of IGC) exported by other gadgets 16 in order to either receive or send their data for mashing up.

Thus, an inter-gadget communication architecture or framework has been disclosed that allows information from different sources to be viewed independently, or correlated, from within a browser. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. Computing apparatus, comprising:
    a computing device coupled with one or more servers and database via a network; and
    an inter-gadget communication (IGC) framework having a browser that runs on the computing device and that comprises software code that displays a plurality of gadgets on a single web page, and the software code that communicates and shares data between the plurality of gadgets, each of the gadgets including an iFrame object with a unique session ID that is generated dynamically by the inter-gadget communication framework, and a gadget library ID that is generated automatically by one of the servers.

2. The apparatus recited in claim 1 wherein the computing device comprises a personal computer.

3. The apparatus recited in claim 1 wherein the computing device comprises a laptop computer.

4. The apparatus recited in claim 1 wherein the computing device comprises a personal digital assistant.

5. The apparatus recited in claim 1 wherein the computing device comprises a cellular device.

6. The apparatus recited in claim 5 wherein the plurality of gadgets comprises a respective plurality of inline frames comprising separate pages, each with its own uniform resource locator (URL).

7. The apparatus recited in claim 6 wherein the gadgets comprise Hypertext Markup Language (HTML) or JavaScript code employing Asynchronous JavaScript and XML (AJAX) requests to get data, or Java Server Pages (JSP) content to acquire data from the servers.

8. The apparatus recited in claim 6 wherein each gadget communicates or interacts with other gadgets on the same web page.

9. The apparatus recited in claim 1 wherein respective ones of the gadgets export specific methods that are used by other gadgets.

10. The apparatus recited in claim 1 wherein each gadget exists inside a respective iFrame.

11. The apparatus recited in claim 1 wherein contents of the iFrame object are provided via a Uniform Resource Locator (URL).

12. The apparatus recited in claim 1 wherein each respective gadget comprises software code that calls JavaScript methods in other gadgets via an iFrame object array of the web page.

13. The apparatus recited in claim 1 wherein contents of the gadgets and the framework reside in the same domain and the gadget points to a specific frame object of another gadget from a frames object array.

14. The apparatus recited in claim 1 wherein methods having a form iframeObject.method (param1, param2, etc.) are accessed by one of the gadgets.

15. The apparatus recited in claim 1 wherein data are passed from one gadget to another as parameters.

16. The apparatus recited in claim 1 wherein data are communicated between gadget iFrames by controlling session Ids of frame objects on the web page and by passing IGC objects between gadgets.

17. The apparatus recited in claim 1 wherein each of the gadgets further includes an IGC category ID generated automatically only upon creation of a new corresponding IGC category.

* * * * *